June 5, 1934.  A. D. MacLEAN  1,961,299
GAS METER
Filed Aug. 15, 1927  6 Sheets-Sheet 1

Inventor
Allen D. McLean
By William A. Strauch
Attorney

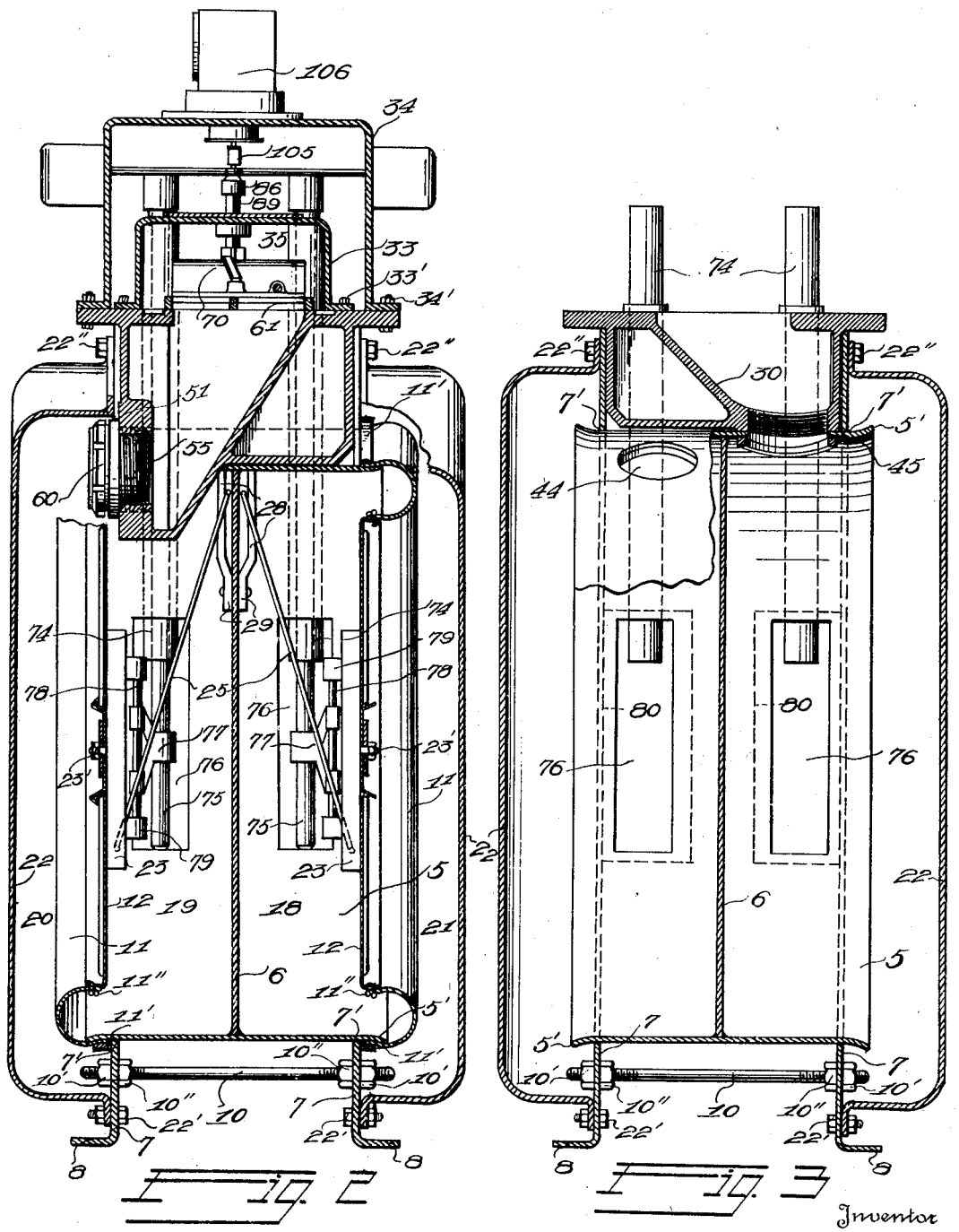

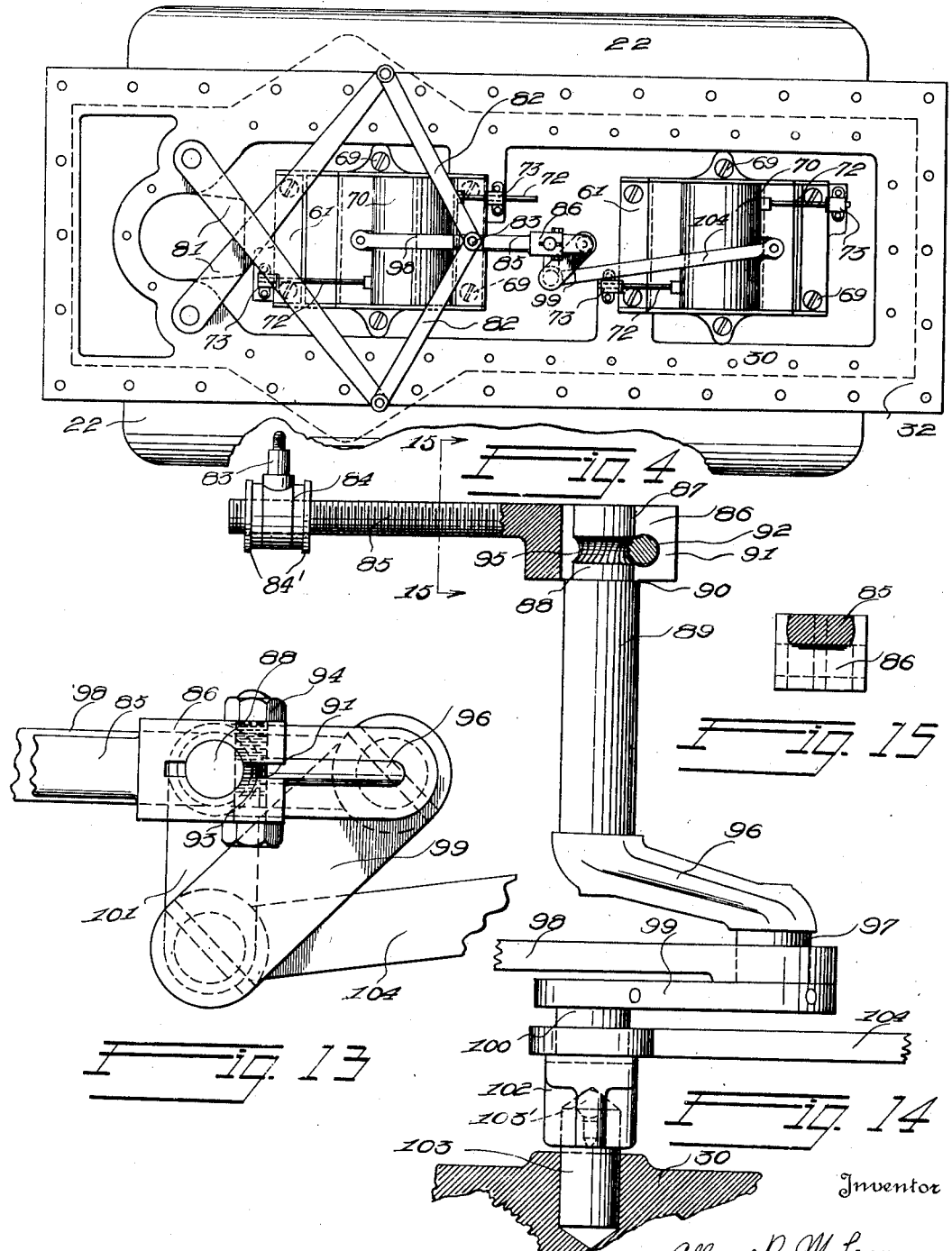

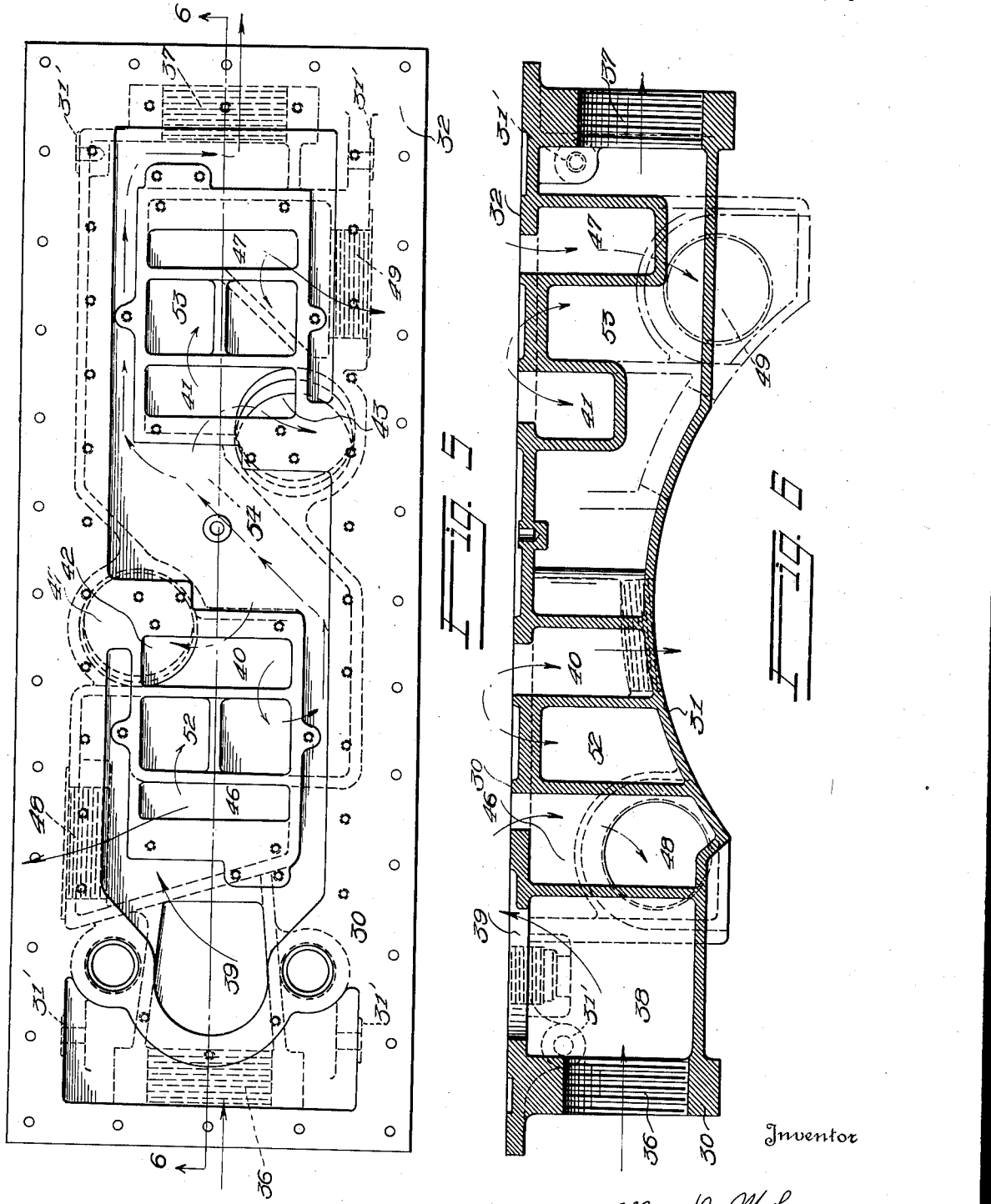

June 5, 1934.  A. D. MacLEAN  1,961,299
GAS METER
Filed Aug. 15, 1927   6 Sheets-Sheet 5
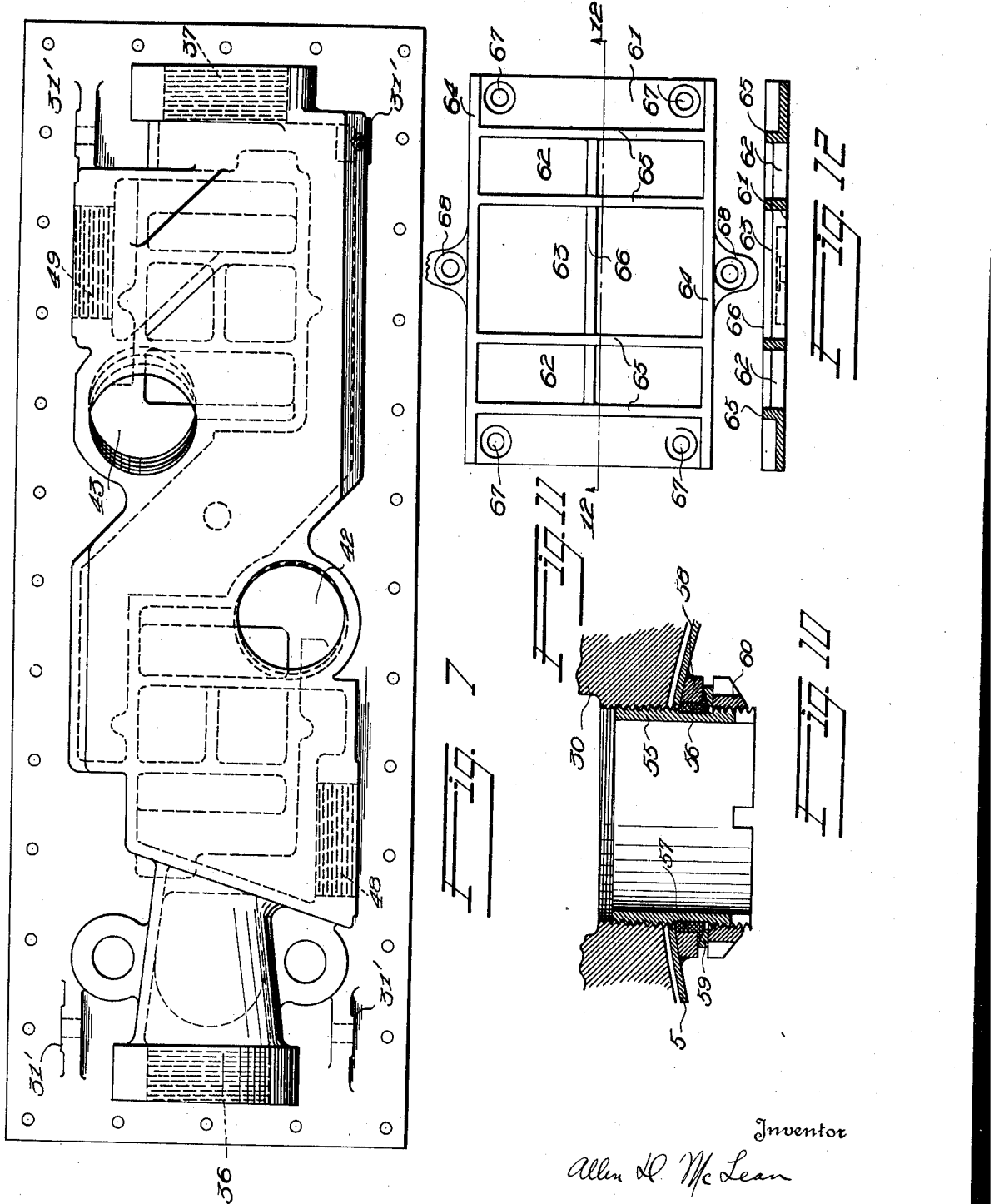
Inventor
Allen D. McLean
By William A. Strauch
Attorney June 5, 1934.  A. D. MacLEAN  1,961,299
GAS METER
Filed Aug. 15, 1927   6 Sheets-Sheet 6
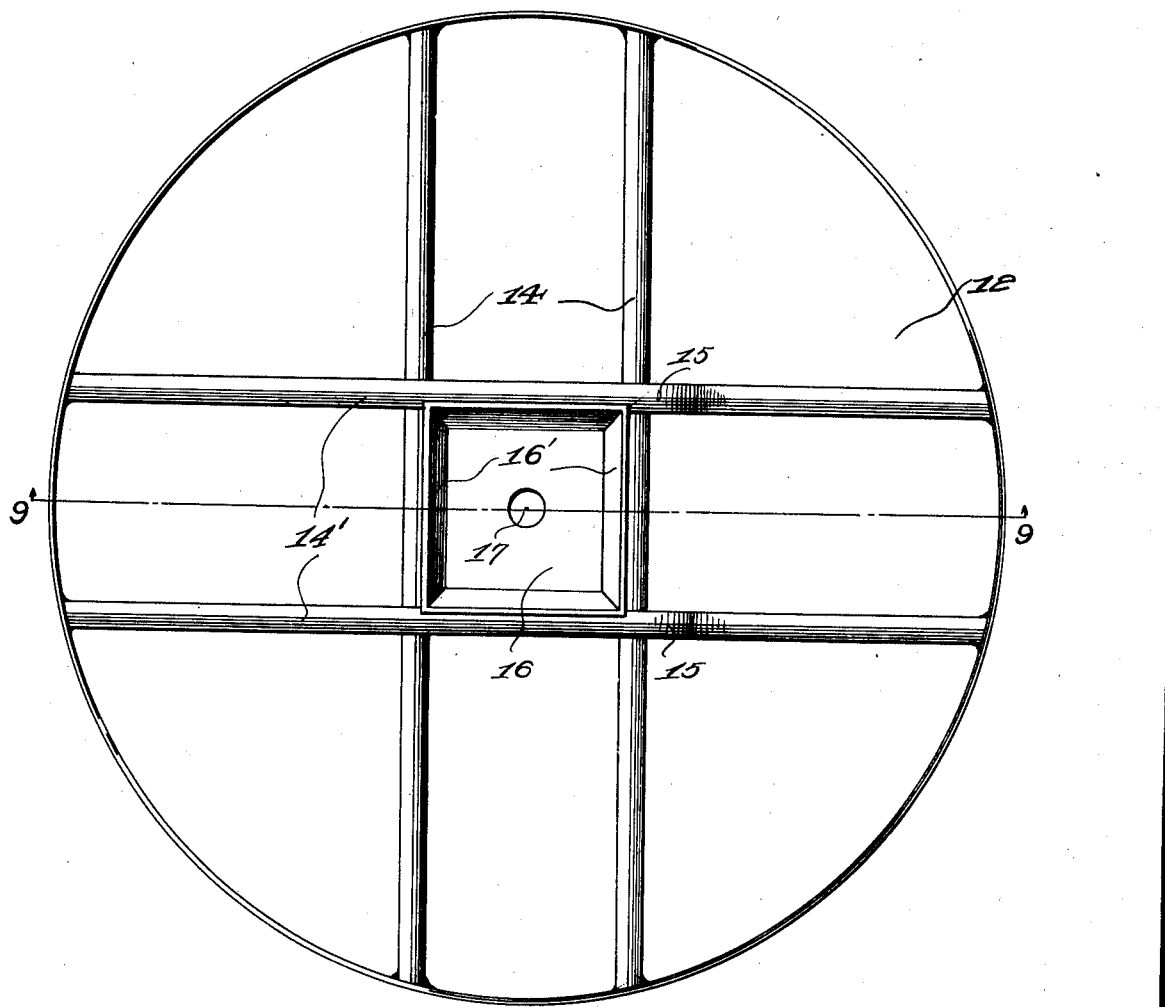
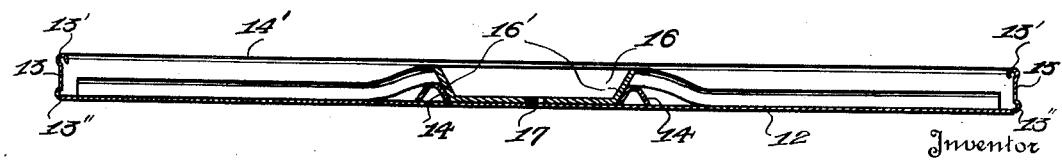
Inventor
Allen D. McLean
By William A. Strauch
Attorney Patented June 5, 1934

1,961,299

UNITED STATES PATENT OFFICE 1,961,299

GAS METER

Allen D. MacLean, Pittsburgh, Pa., assignor to Pittsburgh Equitable Meter Company, Pittsburgh, Pa.

Application August 15, 1927, Serial No. 213,091

17 Claims. (Cl. 73—1)

The present invention relates to improvements in gas meters, and more particularly to improvements in gas meters of the positive displacement type in which the flow of gases through the meter provides the mechanical energy for operating the indicating means.

Various types of positive displacement gas meters have been heretofore proposed which are more or less satisfactory for the measurement of comparatively small volumes of gases, but such prior constructions are not readily adapted for the measurement of relatively large volumes of comparatively high pressure gases because of their higher cost, comparative inefficiency, and cumbersome and unwieldy proportions in larger sizes.

In copending application Serial No. 123,119, filed July 14, 1926, a meter construction is disclosed, especially adapted for the measurement of relatively large volumes of gases at comparatively high pressures in which the general arrangement of valve mechanisms and parts are satisfactory and in which the requisite compactness, lightweight construction, and strength are secured by making the main body of the meter of pressed or sheet steel welded to a casting in which the ports and valve seats are formed. It has, however, in practice been found that the welding of the sheet metal to the casting to provide a gas tight arrangement is difficult and requires very careful workmanship and rigid inspection to prevent the development of leaks and failure of the mechanism under service conditions.

Accordingly a primary object of the present invention is to provide a gas meter construction suitable for the measurement of relatively large volumes of gases at comparatively high pressures which is efficient, light in construction, of compact arrangement and suitable strength, and of which the cost of manufacture is comparatively low.

A further object of the invention is to provide a novel meter construction utilizing a pressed or sheet metal body in combination with a cast ported valve plate without the necessity of welding the sheet metal and cast metal parts together, and which is immune from gas leaks and is sensitive to slight changes in gas pressure.

In the construction of large capacity meters where large diaphragms are utilized it is essential for accurate operation that the diaphragms be of light weight, rigid construction, and properly guided against tilting or cocking to insure proper and accurate operation of the mechanism.

Accordingly another object of the invention is to provide a novel light weight diaphragm construction together with an effective low cost guiding means for the actuating diaphragms of positive displacement meters.

In the operation of gas meters comprising diaphragms responsive to gas pressures and valves operatively connected therewith it is desirable to provide means for adjusting the timing of the valves relative to the position of the actuating diaphragms. A further object of the present invention is to provide a novel tangent adjusting mechanism useful in gas meters of the character mentioned which permits accurate and convenient adjustment of the valve mechanism in gas meters under service conditions.

In the measurement of fuel gases, moisture, grit, dirt, tarry and gummy substances and corrosive substances pass through the meter causing sticking of the valves, corrosion, and scoring of the valves. It has been heretofore the practice to utilize valves and valve seats formed of a high grade white metal alloy to resist corrosion and to provide a seat of sufficient hardness to reasonably resist the scoring caused by the grit and dirt. Moisture readily adheres to the high tin content alloys collecting on the valve seats, and the dirt, gummy, and tarry substances are caught in the moisture causing the valves and seats to become sticky, decreasing the efficiency of the mechanism and causing scoring of the valves and seats decreasing the life of the mechanism.

I have discovered that it is possible to increase the life and efficiency of the meters and to lower the cost thereof by replacing comparatively high cost white metal alloys having a high tin content heretofore utilized in the valve seats and valves and valve mechanisms with parts of cast iron or steel or lower cost metals coated with a thin hard coat of a metal such as chromium, to which water, liquids, and tarry or gummy substances will not readily adhere, in this way minimizing the gumming and scoring of valves and valve parts and at the same time imparting desirable corrosion resisting qualities and hardness to these parts.

Furthermore the close grained and hard nature of the chromium provides good sliding surfaces for the valve parts which results in a low coefficient of friction. As a result low cost and durable constructions are provided which considerably prolong the life of the mechanism and increase the efficiency of operation of the meter as a whole. Accordingly a further object of the invention is to provide novel valve and valve seat construction in which metals of relatively low cost coated or plated of a coating with a metal to which water, liquids, and gummy substances will not readily adhere.

Further objects of the invention are such as will appear in the following detailed description of preferred embodiments of the invention, and are such as may be attained by utilization of the various combinations, sub-combinations, and principles hereinafter set forth, and as defined by the scope of the appended claims.

As shown in the drawings—

Figure 2 is a transverse sectional view substantially on line 2—2 of Figure 1.

Figure 3 is a substantially central transverse sectional view of the valve plate casting and pressed steel body of the meter shown in Figure 1.

Figure 4 is a top plan view of the preferred form of meter with the covers removed.

Figure 5 is a top plan view of the valve-plate casting.

Figure 6 is a central longitudinal sectional view of the valve plate casting on line 6—6 of Figure 5.

Figure 7 is a bottom plan view of the valve plate casting.

Figure 8 is a plan view of an improved diaphragm pan assembly.

Figure 9 is a sectional view on line 9—9 of Figure 8.

Figure 10 is a longitudinal sectional view through one of the pipe nipple gas port connections used in the preferred form of invention.

Figure 11 is a top plan view of one of the valve seats.

Figure 12 is a longitudinal sectional view on line 12—12 of Figure 11.

Figure 13 is a top plan view of the actuating crank construction for the valves.

Figure 14 is a side elevation of the crank structure and an improved tangent adjusting means partially in section.

Figure 15 is a transverse section on line 15—15 of Figure 14.

Figure 1:
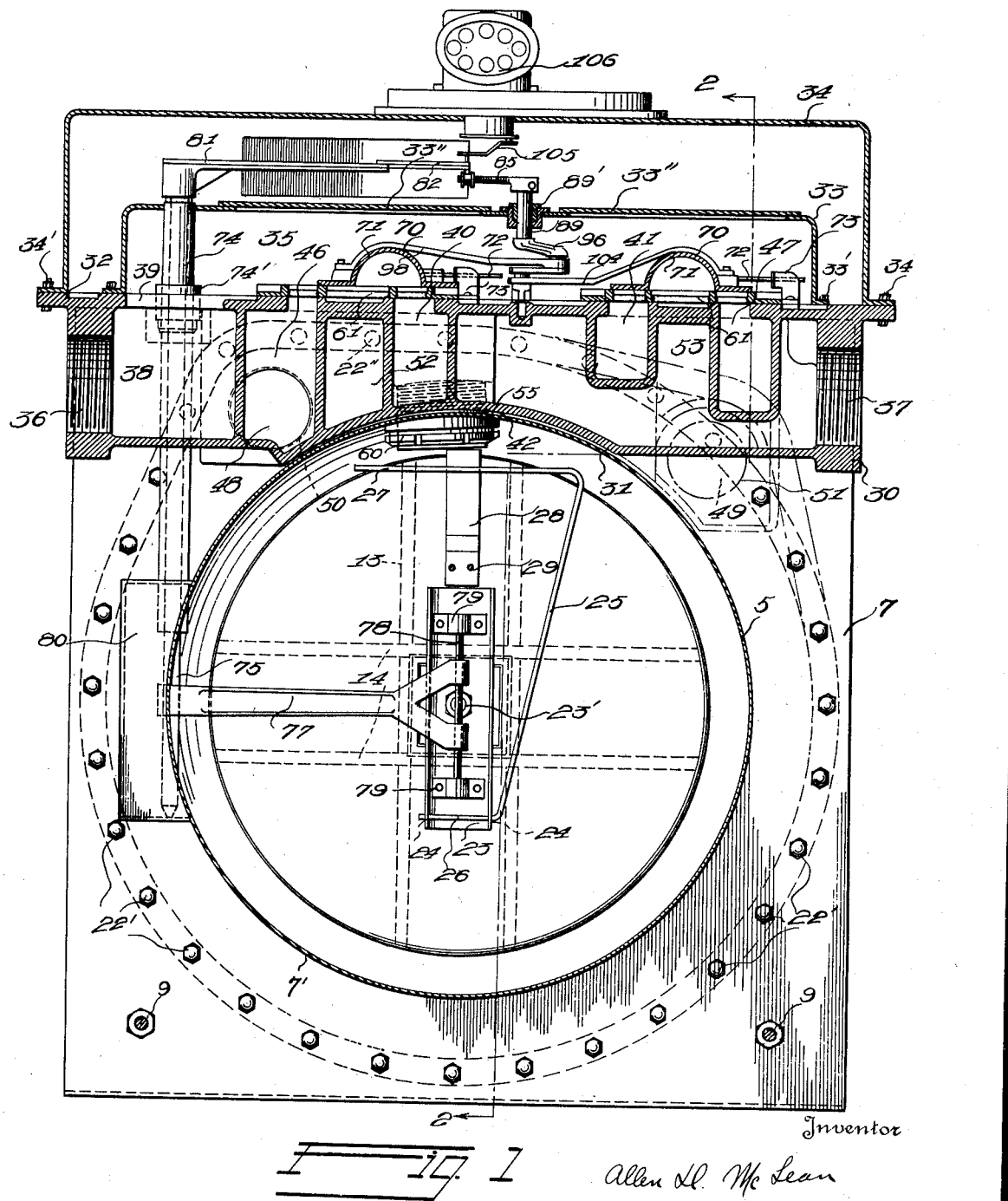
Figure 1 is a substantially central longitudinal sectional view of a preferred form of assembled meter embodying my inventions, the view being taken directly beyond the central partition.

Referring to the drawings by reference characters in which like characters designate like parts, a pressed or sheet steel cylinder 5 is provided having its ends turned outwardly or flared and its edges rounded as indicated at 5' (Figure 3) to provide retaining seats for flexible diaphragm members hereinafter described. Cylinder 5 is provided midway of its length with a sheet metal partition 6 which at its periphery is welded to the inner wall of the cylinder to provide a secure and gas tight central wall.

A pair of plates 7 which are substantially square and provided with central apertures 7' of a diameter equal to that of the outer surface of the cylinder 5 receive and support the cylinder with its flared ends 5' extending beyond the plates as shown in Figures 2 and 3. Plates 7 are positioned on cylinder 5 prior to providing the flared ends 5' and have their lower ends flanged outwardly with respect to partition 6 to provide feet 8 by means of which the meter is supported. Plates 7 are welded to cylinder 5 and intermediate the cylinder 5 and feet 8 are provided with two pairs of aligned apertures 9 (Figure 1) adapted to receive the ends of rods 10 which are provided with threaded ends and nuts 10' (Figures 2 and 3) adapted to engage the outer surfaces of the plates 7 and nuts 10'' adapted to engage the inner surfaces of the plates. Rods 10 in combination with the nuts positively hold plates 7 against both outward and inward movement relative to each other and brace the meter structure.

Supported on and fitting over each flared end 5' of cylinder 5 is the outer edge of a diaphragm (Figure 2) including a section 11 of leather or similar material which is secured in position by means of a suitable contractible clamping band 11'. Diaphragm section 11 as shown is bowed in transverse section to permit it to yield in response to gas pressures and has its inner edge secured by a suitable wire wrapping 11'' to a pan assembly. Each pan assembly comprises a comparatively shallow metallic pan 12 (Figures 2, 8 and 9) the rim 13 of which is beaded both at its edge and at its junction with the base of the pan as indicated at 13' and 13'' respectively (Figure 9), and between which the inner edge of the flexible diaphragm section 11 is secured. Beads 13' and 13'' and wire wrapping 11'' provide positive gas tight retaining means and a gas tight connection between the diaphragm section 11 and pan 12. Pan 12 is braced by means of two pairs of ribs of inverted U-shape in section 14 and 14' constructed of suitable metal. Ribs 14' extend at right angles to and overlap ribs 14 as indicated at 15 (Figure 8). The ends of these ribs are soldered to the inner surfaces of rim 13 of the pan 12 and are also preferably welded where they are in contact at the overlapping points. Pan 12 is further braced by means of a central metallic box or auxiliary pan structure 16 which has its sides outwardly flared as indicated at 16'. Pan 16 rests between ribs 14 and 14' with its bottom engaging the bottom of the pan and its flared sides engaging the inner sides of the ribs. Pan 16 is retained in position preferably by soldering the sides thereof to the ribs. Pans 12 and 16 are provided with a central aperture 17.

The partition 6 and diaphragm structures comprising the flexible members and pan assemblies provide a pair of inner gas measuring chambers 18 and 19 (Figure 2) and outer gas measuring chambers 20 and 21 are provided by the diaphragm structures and a pair of covers 22 which are secured to the plates 7 by means of bolts 22' and which are secured inward of the valve plate casting hereinafter referred to and by means of studs 22'' (Figure 1) adjacent said casting in order not to penetrate the comparatively thin walls of the casting.

It will be understood by those skilled in the art that the pan assemblies are subject to varying gas pressures from the inner and outer measuring chambers and will, due to flexible diaphragm sections 11, move inward and outward relative to the partition 6. It is essential that no cocking or tilting of the diaphragm pans be permitted in the operation of the meter and one of the important features of this invention is the provision of a novel, cheaply constructed and effective means for guiding the pan assemblies in their motion, that is, to prevent the pan assemblies from moving out of a plane at right angles to the direction of their motion. Each guiding means comprises a diaphragm bracket 23 (Figure 1) consisting of a comparatively wide channel shaped pressed steel piece secured to the base of each pan assembly in box 16 by means of a bolt 23' passing through the base thereof and through aperture 17. At the lower end thereof each bracket 23 is provided with aligned apertures 24 in its outwardly turned side sections. A long stiff wire guide 25 has one end thereof bent over and extended through the apertures 24 as indicated at 26. The other end of wire 25 is bent over parallel to the end extending through the aperture 24 as indicated at 27 and is adapted to bear against the partition 6. Each section 27 is kept in contact with partition 6 and guided in its movement by means of a piece of strip steel 28 (Figures 1 and 2) bent in at its lower end and riveted to the partition 6 as indicated at 29. The lower end of each strip 28 is bent inward just sufficiently to allow end 27 of the guide wire to move up and down freely against partition 6 and to prevent the section 27 from tilting out of a plane parallel to the partition. Guide strips 28 are secured directly opposite each other on opposite sides of the partition 6 which positions the two wires 25 at an angle to the partition.

A valve plate casting 30 provided with a curved seating portion 31 (Figure 1) on the inner side thereof adapted to receive the upper portion of cylinder 5 and is secured between the upper ends of plates 7 by means of three securing bolts and through holes formed in and by a stud threaded into the securing ears or projections 31' (Figures 5, 6 and 7) of casting 30. Formed on the top of casting 30 is a cover securing flanged section 32 to which an inner valve chamber cover 33 (Figures 1 and 2) and a meter casing cover 34 are secured. Cover 33 is secured in position by means of studs 33' and preferably a gasket is interposed between the casting and base of the cover to provide a gas tight connection between casting 30 and cover 33 which is further provided with removable lids 33''. Cover 34 is secured to casting 30 by means of bolts 34' extending through a flanged base thereof and the outwardly extending flange 32 of casting 30. Cover 33 in conjunction with casting 30 provides a gas chamber 35. Casting 30 is provided with an inlet gas passage 36 (Figures 1, and 5 to 7) and an outlet gas passage 37. Passages 36 and 37 are internally threaded as shown whereby the meter can be installed in a gas line. A passage 38 in communication with inlet passage 36 and with chamber 35 through opening 39 is provided in casting 30.

Intermediate port 39 and outlet passage 37, casting 30 is provided with passages and ports establishing communication between the chamber 35 and the inner and outer gas measuring chambers 18, 19, 20 and 21, as follows.

Communication between chamber 35 and the inner measuring chambers 18 and 19 is provided by means of the passages 40 and 41 and ports 42 and 43 respectively. Ports 42 and 43 are formed in the bottom of casting 30 and are disposed in alignment with apertures 44 and 45 (Figure 3) of cylinder 5 formed on opposite sides of partition 6.

Communication between the chamber 35 and the outer measuring chambers 20 and 21 is provided by means of the passages 46 and 47 and ports 48 and 49 respectively formed in casting 30. Ports 48 and 49 are formed in opposite sides of the casting 30 and are disposed in alignment with apertures 50 and 51 (Figures 1 and 2) formed in plates 7.

Intermediate passages 40 and 46, casting 30 is provided with a passage 52, and is further provided with a passage 53 intermediate the passages 41 and 47. Passages 52 and 53 are in communication with chamber 35 and with the outlet passage 37 by means of a passage 54 formed in the casting and extending from the passage 52 to the outlet 37.

One of the essential features of this invention is the provision of gas tight connections at the junction of the ports 42, 43, 48 and 49 with the apertures 44, 45, 50 and 51 respectively without resorting to welding operations which have proven to be unsatisfactory as it is very difficult to weld cast steel or cast weldable material to rolled steel, or pressed steel, and obtain a solid and gas tight joint. A preferred type of connection used in the present invention for making a gas tight joint is shown in detail in Figure 10 and comprises a pipe nipple 55 threaded at each end and provided with a machined surface intermediate the threaded ends as indicated at 56. One end of the nipple is inserted into one of the above mentioned ports which are internally threaded for this purpose. The nipple projects from casting 30 through the corresponding apertures 44, 45, 50 or 51 in the cylinder 5 or plates 7 respectively, and a lead or similar soft metal packing material 57 is inserted between the machined surface and a steel ring 58 with an outer flat seating surface welded to the cylinder or plates. The packing material is pressed into position tightly. A tapered ring 59 is then placed over the packing material and a packing ring nut 60 is screwed down on the threaded extending portion of nipple 55 into engagement with the tapered ring 59 to tightly compress the packing 57, making a positive gas tight connection between casting 30 and the pressed steel structure.

Secured to the top of the casting 30 is a pair of valve seats shown in detail in Figures 11 and 12, each comprising a plate 61 of a high tin content white metal alloy, or preferably of cast iron or steel or other base metal plated with a coating of chromium, having end port openings 62 and a larger central port opening 63 formed therein, the openings being defined by parallel side flanges or ribs 64 and parallel flanges or ribs 65 extending at right angles thereto, the flanges 65 being strengthened by a central rib 66.

Each plate 61 is provided with apertures 67 at its ends and apertured ears 68 at its sides through which suitable cap screws 69 (Figure 4) extend to secure the valve seats to casting 30. One valve seat is secured to the casting with its end openings 62 in register with the passages 40 and 46 and its central opening 63 in register with passage 52 while the other valve seat is disposed with its end openings 62 in register with the passages 41 and 47 and its central opening 63 in register with the passage 53.

Cooperating with each of the valve seats 61 is a slide valve 70 (Figures 1 and 4) of a high tin content white metal alloy or preferably of cast iron or steel on which a coat of chromium has been deposited. Each valve 70 is provided with an arched central portion 71 of a width substantially equal to the width of central openings 63 in the valve seats as shown in Figure 1. Each valve is adapted to move back and forth on its seat and will, except approximately in central position, put into communication the passage 52 or 53 with one or the other passages on either side thereof. Each valve 70 is guided in its reciprocating movement on its seat by means of suitable guide rods 72 (Figures 1 and 4) extending from opposite sides of the arched portion thereof and through guides 73 suitably secured to the top of casting 30. Means are provided to communicate the movements of the diaphragm in response to gas pressures in the chambers 18, 19, 20 and 21 to the valves and such means comprises the following.

Extending through casting 30 at either side of the passage 38 and beyond the top and bottom of the casting is a pair of flag rod casings 74, the casings extending through the cover 33 and being secured gas tight in casting 30 by means of suitable packing glands 74' (Figure 1) and in the cover by caulking or soldering. Rotatably mounted in each of the casings 74 is a flag rod 75 having its ends extending beyond the ends of the casing with its lower end extending into a rectangular opening 76 in the cylinder 5. The lower ends of the flag rods 75 are connected with the respective diaphragms by means of arms 77 (Figures 1 and 2) which at one end are rigidly secured to the flag rods and at their other ends are pivotally connected to perpendicular rods 78 having their ends mounted in brackets 79 secured to the diaphragm brackets 23.

The openings 76 and inner ends of the casings 74 and rods 75 are surrounded by suitable covers 80 (Figures 1 and 3) which are welded to cylinder 5 in gas tight manner in order that gas will not escape from the inner chambers.

The outer ends of the flag rods 75 have secured thereto one end of arms 81 (Figure 4) which at their opposite ends are pivotally secured to the ends of links 82. The opposite ends of the links 82 are pivotally connected by a stud 83 projecting from a collar 84 (Figure 14). Collar 84 is slidable on tangent arm 85 which as shown in Figures 14 and 15 is flattened on two sides for preventing rotation of collar 84 and has two opposite rounded threaded sides between the flattened sides for engagement of nuts 84' adjustably engaging collar 84. The arm 85 extends from an enlarged head portion 86 which is centrally vertically apertured as indicated at 87 to receive a reduced end 88 of the crank post 89, the end 88 and post 89 providing a shoulder 90 which supports the head 86. The head 86 is split from beyond the aperture 87 to its end as indicated at 91 (Figure 13) and the split portion is apertured and threaded adjacent the aperture 87 at right angles to the plane of the split as indicated at 92 to receive a threaded bolt 93 provided with a nut 94.

The reduced end 88 of the crank post 89 is provided with a milled worm thread 95 adapted to mesh with the threads on the bolt 93. Due to the split 91 the head 86 can be tightly clamped to the end 88 by means of the bolt 93 and nut 94. By loosening the nut 94 and turning the bolt 93 one way or the other the threads thereof engage the worm thread 95 and a worm and worm wheel action is obtained which rotates tangent arm 85 either forward or backward and the angular relation of the tangent arm with respect to crank post 89 may in this way be conveniently adjusted. This arrangement together with the threaded connection of collar 84 to the tangent arm 85 provides a facile and convenient means for varying the position and timing of the valves in the meter with respect to the position of the diaphragms.

Crank post 89 is journaled in a gas tight bearing and stuffing box structure 89' (Figure 1) supported in cover 33 and at its lower end crank post 89 has formed integrally therewith a crank arm 96 (Figure 14) provided with a cylindrical angularly related end portion 97 to which is pivotally secured one end of a connecting link 98 which at its opposite end is pivotally secured to the left valve 70 in Figure 1.

Fixedly secured to the end 97 is one end of a link 99 the opposite end of which is fixedly secured to a cylindrical crank section 100 extending from one end of an arm 101. The opposite end of arm 101 is provided with an enlarged cylindrical section 102 which is recessed and journaled on a stud 103 the lower end of which is rigidly secured in casting 30. The upper end of stud 103 is recessed and a ball 103' on which section 102 rests functions as an antifriction bearing supporting the weight of the parts. Pivotally connected to crank section 100 is one end of a connecting link 104 the opposite end of which is pivotally connected to the right valve 70 in Figure 1. Connected to the stud 83 outward of the links 82 is one end of an arm 105 (Figure 1) the other end of which is connected to a meter clock mechanism 106 of any well known type supported on casing 34.

*Operation*

In operation of the meter, the gas to be measured enters from the gas line through passage 36 and into chamber 35 through passage 38. From chamber 35 the gas passes into the passages in communication with the measuring chambers 18 and 20 or into the passages in communication with the measuring chambers 19 and 21 depending upon the positions of the slide valves 70. The direction of flow of the gas is indicated by arrows in Figures 5 and 6. The continuous flow of gas through the meter causes a pressure drop between the inlet 36 and outlet 37 which causes the diaphragm structures to alternately and successively move inward and outward. The movement of the diaphragms is transmitted through the arms 77 to flag rods 75 causing rods 75 to oscillate about their longitudinal axes. Rods 75 in turn oscillate arms 81 in such manner that tangent arm 85 is rotated continuously about the axis of crank post 89 rotating the crank post and related members 96, 97, 99, 100 and 101. This will cause the connecting links 98 and 104 to reciprocate imparting a reciprocating movement to the sliding valves 70.

The arched portions 71 of the valves 70 will alternately put the passages leading to the inner and outer measuring chambers on opposite sides of partition 6 into communication with the inlet and outlet ports of the meter timing the admission and discharge of gas to maintain continuous operation of the diaphragms and rotation of arm 85 and the related parts so long as a difference in gas pressure exists between the inlet and outlet openings 36 and 37 of the meter. For each cycle of operation of the meter mechanism a measured quantity of gas will pass from the inlet to the outlet and due to the rotation of arm 85 the clock mechanism 106 will be operated to indefinitely timed relation to indicate the volume of gas passing through the meter. When the valve seats and valves are plated with chromium, water, gummy and tarry substances will not so readily adhere thereto and the valves will offer less resistance to motion and at the same time will resist corrosion to a greater degree, improving the operation of the meter as a whole.

It will be understood that the meter is calibrated and adjusted so that the indicating mechanism 106 will properly register the volume of gas passing through the meter. When it is desired to adjust the timing of the valves with respect to the positions of the diaphragms for purposes of calibration, the nut 94 of bolt 93 is loosened. The threads of the bolt engaging the milled thread 95 will then cause tangent arm 85 to be moved one way or the other upon rotation of the bolt to effect the adjustment desired. After the adjustment is made the nut 94 is tightened up binding the split portion of the head into fixed engagement with the crank post. In this way it will be seen that bolt 93 in addition to its function of clamping the arm 85 in position provides a convenient means for adjusting the angular position of the tangent arm. When it is desired to adjust the position of stud 83 the actuating links 82 and arm 105 are disconnected therefrom and collar 84 is then turned on the threaded portion of arm 85 to adjust the position of the stud radially. After this adjustment has been made the links 82 and 105 may again be connected to the stud.

It will accordingly be seen that an efficient gas meter construction of comparatively low cost is provided which is adapted for the measurement of large volumes of gases, and that various combinations and sub-combinations of elements are provided useful in other types of meters and in other relations than those for which they are herein described. It also will be apparent to those skilled in the art that wide variations may be made in the details of the invention heretofore described without departing from the spirit of the invention as defined by the scope of the appended claims, and that only preferred embodiments of the invention have been set forth.

Accordingly, what is desired to be secured by Letters Patent and claimed as new is:

1. In a gas meter, a diaphragm pan assembly comprising a pan member having a beaded rim portion; two pairs of parallel bracing ribs having their ends secured to said rim portion; the ribs of one pair intersecting and extending at right angles to the ribs of the other pair; and a box member having outwardly flaring sides secured between said ribs of both pairs.

2. In a gas meter, a sheet steel cylinder, plates supporting said cylinder; a valve plate casting supported above said cylinder between said plates; said casting being provided with ports; said cylinder and plates being provided with apertures in alignment with said ports; and mechanical gas tight connections between the ports and apertures.

3. In a gas meter, a valve plate casting provided with threaded ports; a pressed steel structure supporting the casting and provided with apertures aligned with said ports; a nipple secured in each port; a packing ring surrounding each nipple; and means to compress the packing ring tightly against the margin of said aperture.

4. In a gas meter, flexible diaphragms; sliding valves; a crank structure including a crank post; connections between sliding valves and crank structure; connections between the diaphragms and said crank structure including a rigid arm provided with an aperture on one end thereof, said aperture engaging said post and being mounted so that the arm is free to move with respect to the post for adjustment purposes; and means on said arm and engaging said post to angularly adjust said arm with relation to said post, said means locking said arm and post together for simultaneous rotation in all adjusted positions.

5. A gas meter comprising an open-ended cylindrical member; plates engaging the external surface of said cylindrical member inward of the ends thereof; a partition member in said cylindrical member intermediate the ends thereof; a cast metal ported structure disposed between said plates and above said cylindrical member; covers engaging said plates; means detachably securing said covers to said plates; and other means jointly detachably securing said covers and said plates together and said plates to said structure.

6. The structure defined in claim 5 in which a diaphragm assembly is detachably secured to the opposite ends of said cylinder.

7. In a gas meter, a diaphragm pan member having a pair of substantially parallel bracing ribs on one face thereof and another pair of substantially parallel bracing ribs intersecting said first mentioned pair.

8. A diaphragm pan assembly for gas meters comprising a shallow pan member having a plurality of bracing ribs thereon, said ribs intersecting at substantially right angles.

9. The structure as in claim 8 wherein the pan member is circular and said ribs are chords of said circular pan member.

10. The structure as in claim 8 wherein said ribs are arranged in groups, the ribs of each group being parallel to one another and at right angles to those of the other group.

11. The structure as in claim 8 wherein said pan member is circular, and said ribs are arranged in groups, the ribs of each group being parallel to each other and at right angles to those of the other group, each rib being a chord of said circular pan, said ribs defining a centrally disposed rectangle.

12. In a gas meter, a diaphragm pan member having a pair of substantially parallel bracing ribs on a face thereof and a box member secured thereon between said ribs.

13. A diaphragm pan assembly for gas meters comprising a circular pan member, a plurality of ribs secured to said pan member, said ribs being chords of the circular pan member and intersecting at right angles to define a central rectangle, and a box member secured within said central rectangle.

14. In a gas meter, valve operating mechanism, including a rotary shaft having a screw threaded portion and having a crank for operating the valves, an arm for rotating said shaft, said arm having a collar surrounding said shaft, and means to angularly adjust said arm with relation to said shaft comprising a member rotatably supported by said collar and engaging the screw threaded portion of said shaft.

15. The invention as in claim 14, wherein said collar is split, and said member passes through the said split portion and is adapted to compress said split portion into tight engagement with said shaft.

16. The invention as set forth in claim 14 wherein said member comprises a threaded bolt, and said shaft has a groove thereon with a worm thread engaging the threads on said bolt.

17. A gas meter comprising an elongated cast metal ported structure, a plate detachably secured to each side of said structure, a cylindrical member below said structure and extending through said plates, and covers detachably secured to said plates and enclosing said cylindrical member, said plates being provided with laterally outwardly turned foot portions in which spacing and reinforcing bolts extend through said plates adjacent the lower corners thereof.

ALLEN D. MacLEAN.